March 4, 1930.  J. C. SCHEELER  1,749,000
COUPLING FOR FENCE POSTS
Filed Dec. 27, 1928
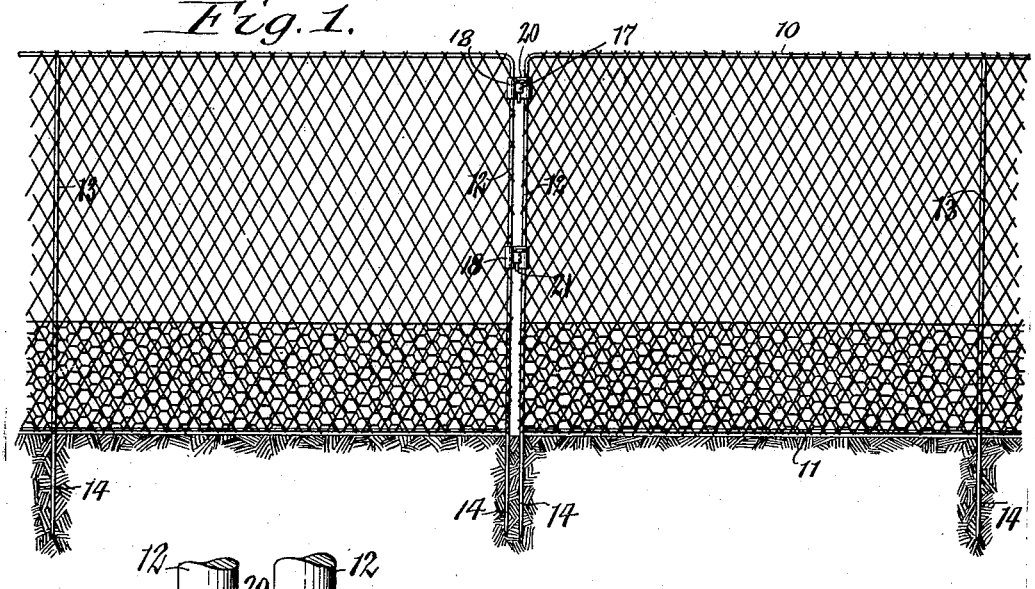
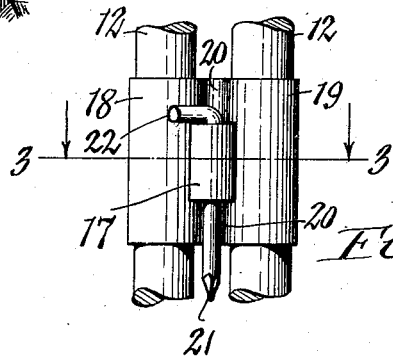
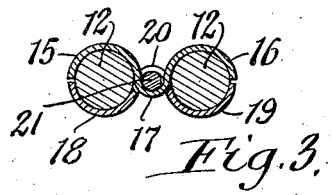
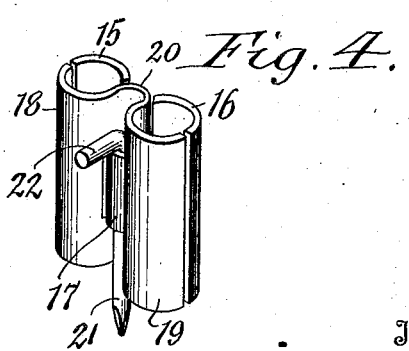
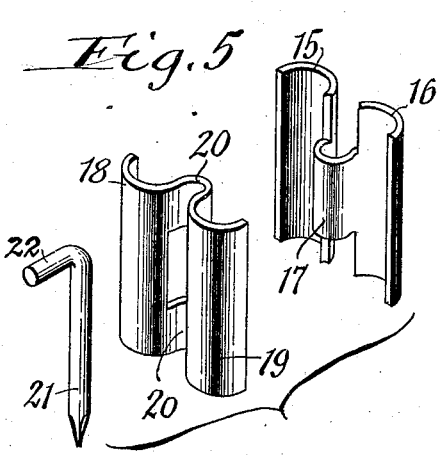
Inventor
John C. Scheeler
By Popp & Powers
Attorneys Patented Mar. 4, 1930

1,749,000

UNITED STATES PATENT OFFICE

JOHN C. SCHEELER, OF BUFFALO, NEW YORK, ASSIGNOR TO BUFFALO WIRE WORKS CO., INC., OF BUFFALO, NEW YORK, A CORPORATION OF NEW YORK

COUPLING FOR FENCE POSTS

Application filed December 27, 1928. Serial No. 328,705.

This invention relates to a coupling which is more particularly intended for detachably connecting the sections of a portable wire fence having end posts which are adapted to be driven into the ground but the same may also be used for connecting other parts of a similar nature, such as wire guards having round iron frames.

Heretofore sections of fencing of this character have usually been wired together at their opposing ends which is objectionable in that it produces an unfinished appearance and also renders it inconvenient to disconnect the sections when it is desired to transfer the same from one ground space to another.

The purpose of this invention is the production of a coupling of this character which can be manufactured at low cost, which improves the appearance of the portable fencing and which can be readily applied to the fence sections when erecting them and also removed from the fence sections to permit of more conveniently shifting the same from one place on the land to another.

In the accompanying drawings:

Figure 1 is a fragmentary elevation of two adjacent portable wire fence sections which have been erected on the ground and connected at their opposed vertical ends by couplings embodying this invention.

Figure 2 is an elevation, on an enlarged scale, of this coupling applied to the end posts of two fence sections.

Figure 3 is a horizontal section taken on line 3—3, Figure 2.

Figure 4 is a perspective of the coupling assembled.

Figure 5 is a similar view of the same dismembered.

In the following description similar characters of reference indicate like parts in the several figures of the drawings.

In Figure 1 two sections of a portable wire fence are represented as connected by couplings made in accordance with the present invention. Although these sections may be of any suitable form as to detail each of them preferably consists of a frame having upper and lower horizontal rods or bars 10, 11, upright posts or rods 12 connecting the corresponding ends of the horizontal rods, and one or more intermediate upright posts or rods 13 connecting the intermediate parts of the horizontal rods.

Each of the posts is provided at its lower end with a downward extension 14 forming a spike or spur which is driven into the ground for holding the fence section erect wherever the same is placed.

The fence sections may be placed end to end either in line or at an angle relatively to one another to suit the character of fencing, enclosure or pen desired. When thus erected on the ground the upright posts or rods 12 at the opposing ends of two adjacent sections are connected by one or more couplings which embody my invention and which in their preferred form are constructed as follows:

The coupling comprises two plates which in their normal operative position oppose each other and each of which is preferably stamped or bent into corrugated form out of a single sheet of metal. One of the plates is bent to form two semi-cylindrical jaws 15, 16 at opposite ends thereof, the concave sides of which face inwardly and between these jaws this plate is provided with a single locking loop 17 which connects the central parts of the jaws 15, 16 and has its concave side facing outwardly.

The other plate is bent to form two semi-cylindrical jaws 18, 19 at opposite ends thereof, the concave sides of which face inwardly and between these jaws this plate is provided with two locking loops 20, 20, which connect the upper and lower parts of these jaws and have their concave sides facing outwardly.

The two plates are applied to opposite sides of a pair of opposed posts on adjacent fence section so that the jaws of each plate engage with the corresponding sides of the respective posts and the single locking loop of one plate is arranged between the two locking loops of the other plate. In this position of the two plates the loops of the same cross each other and are arranged on a line which is between the two pairs of jaws of the plates and parallel therewith.

After the plates have been thus applied to the two posts or end members of two fence sections a locking pin 21 is inserted between the crossed loops of the respective plates so that the jaws are securely held in operative engagement with the fence posts, as best shown in Figure 3. This pin is preferably provided at its upper end with a laterally projecting arm 22 forming a stop adapted to engage with the upper edge of the single locking loop and thus limit the downward movement of this pin.

Assembling of the coupling with the fence sections in the manner described can be effected expeditiously, easily and conveniently and when assembled the fence sections are securely held in their proper position and produce a completed fence which is very neat and attractive in appearance.

The couplings can also be very easily detached from the fence sections to permit of shifting the same and re-erecting the same on another part of the lawn, or other part of the land if for any reason this is necessary or desired.

Owing to the simplicity of this coupling the same can be produced at low cost thereby enabling a fence to be equipped with the same without appreciably greater expense than the means heretofore employed for this purpose.

I claim as my invention:

1. A coupling for connecting two fence posts or like members, comprising two plates which normally oppose each other and each of which is provided at its opposite ends with jaws adapted to engage with the corresponding sides of said members and said plates having loops which cross each other, and a pin insertable between said crossed loops.

2. A coupling for connecting two fence posts or like members, comprising two plates which normally oppose each other and each of which is provided at its opposite ends with jaws adapted to engage with the corresponding sides of said members and said plates having loops between said jaws which cross each other, and a pin insertable between said crossed loops.

3. A coupling for connecting two fence posts or like members, comprising two plates which normally oppose each other and each of which is provided at its opposite ends with jaws adapted to engage with the corresponding sides of said members, one of said plates having a pair of loops arranged on a line between the jaws thereof and parallel therewith, and the other plate having a single loop arranged on a line between the jaws thereof and parallel therewith, and said single loop being arranged between said pair of loops so that the loops of the plates cross one another, and a locking pin insertable between said crossed loops for holding the jaws of the plates in engagement with said members.

In testimony whereof I hereby affix my signature.

JOHN C. SCHEELER.